United States Patent [19]
Pettigrew

[11] 4,323,838
[45] Apr. 6, 1982

[54] RMS CONTROLLED LOAD TAP CHANGING TRANSFORMER

[75] Inventor: Robert D. Pettigrew, Pinellas, Fla.

[73] Assignee: Beckwith Electric Co., Inc., Largo, Fla.

[21] Appl. No.: 232,667

[22] Filed: Feb. 9, 1981

[51] Int. Cl.[3] .................................................. H02J 3/12
[52] U.S. Cl. ...................................................... 323/256
[58] Field of Search ............... 323/205, 208, 255, 256, 323/301, 340, 341

[56] References Cited

U.S. PATENT DOCUMENTS 3,721,894 3/1973 Beckwith ............................ 323/257

*Primary Examiner*—William W. Shoop
*Attorney, Agent, or Firm*—Leo J. Aubel

[57] ABSTRACT

A circuit for controlling a load tap changing transformer including a true RMS to D.C. converter for regulating the output of the transformer as a function of the RMS voltage.

7 Claims, 1 Drawing Figure

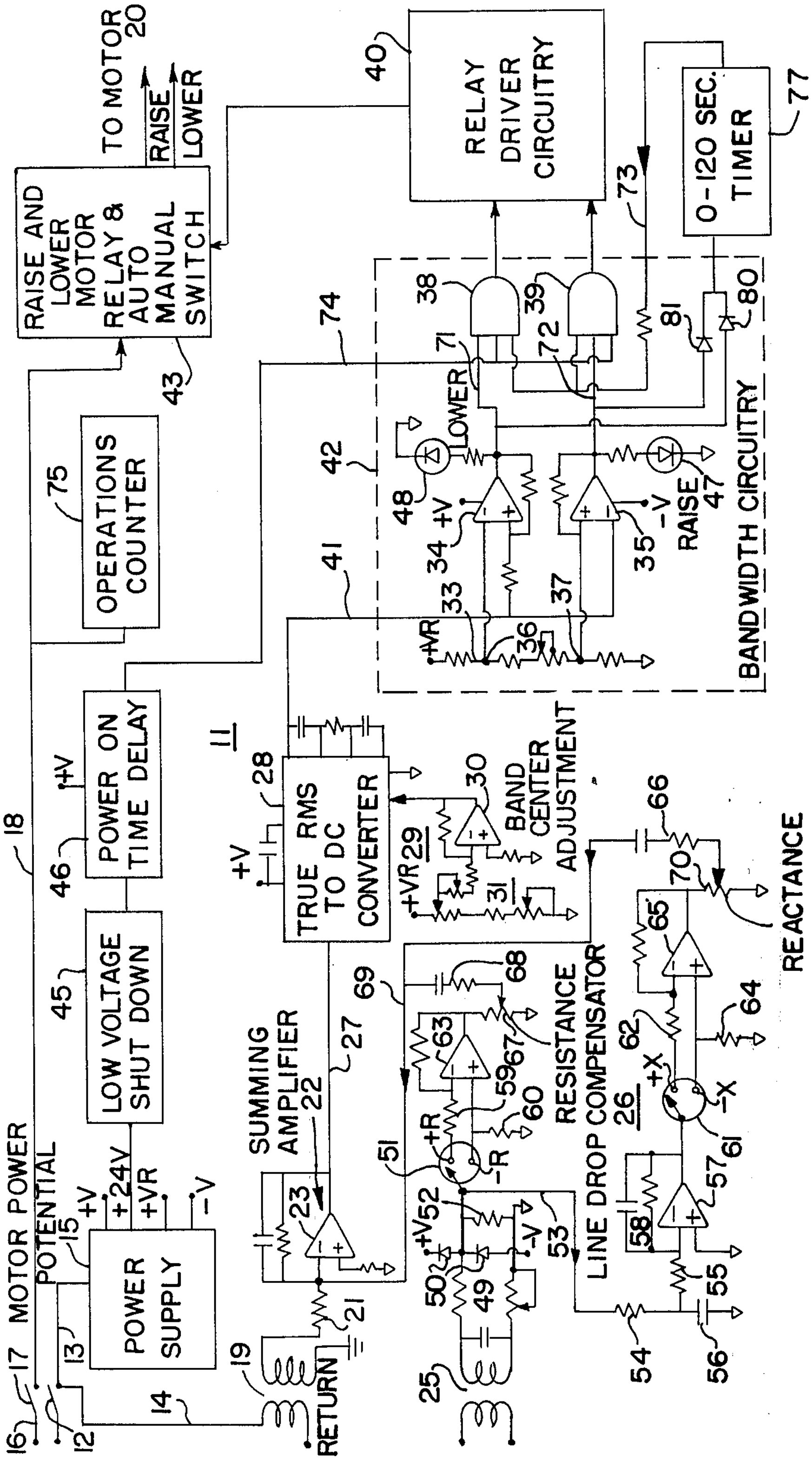
TO MOTOR 20
RAISE
LOWER
RAISE AND LOWER MOTOR RELAY & AUTO MANUAL SWITCH
RELAY DRIVER CIRCUITRY
0-120 SEC. TIMER
OPERATIONS COUNTER
POWER ON TIME DELAY
LOW VOLTAGE SHUT DOWN
POWER SUPPLY
TRUE RMS TO DC CONVERTER
BAND CENTER ADJUSTMENT
BANDWIDTH CIRCUITRY
SUMMING AMPLIFIER
RESISTANCE
LINE DROP COMPENSATOR
REACTANCE
MOTOR POWER
POTENTIAL
RETURN
+V
+24V
+VR
-V
+R
-R
+X
-X
LOWER
RAISE

RMS CONTROLLED LOAD TAP CHANGING TRANSFORMER

DESCRIPTION

Technical Field

Electrical power transmission systems employ tap changing transformers which may be automatically adjustable to maintain a constant voltage. The present invention is directed to an RMS voltage controlled load tap changing transformer.

Background of Invention

This invention is generally related to U.S. Pat. No. 3,721,894 entitled Regulator Control issued on Mar. 20, 1973, to Robert W. Beckwith; the disclosure thereof being incorporated herein, by reference.

Tap changing transformers which automatically adjust to maintain a constant voltage are utilized in electrical power transmission systems for monitoring and controling the voltage output. In such systems, any changes from a given voltage bandwidth are monitored and means are provided for changing the tap of the associated power transformers to regulate or bring the voltage within the selected bandwidth.

Tap changing transformer controls commonly provide means to change tap selector switches to contact a point of desired potential. For example, should the voltage in the electrical power transmission system go below a selected potential, provision is made to energize an associated motor to drive tap selector switches to make contact to a point of higher potential. Conversely, if the voltage goes above a selected potential, the motor is energized to drive the tap selector switches to make contact with a point of lower potential.

The voltage level relays used for control of such tap changing transformers require a means of accurately determining the AC voltage level output from the associated transformer. Various types of AC voltage detectors including peak detectors, harmonic filter detectors, and average of rectified wave detectors are used for the foregoing purpose. While in an ideal condition, most of the AC voltage detectors should operate satisfactorily, the effect of wave shape distortion on each detector is different and these effects can be critical to the output power.

SUMMARY OF THE INVENTION

The present invention comprises a circuit for controlling a load tap changing transformer including a true RMS to D.C. converter (detector) which provides a D.C. voltage representative of the true RMS voltage. The true RMS voltage is the primary factor that should be regulated in an electrical power distribution system since it is representative of the power delivered to the customer.

The foregoing features and advantages of the present invention will be apparent from the following more particular description of the invention. The accompanying drawing herein is useful in explaining the invention wherein:

BRIEF DESCRIPTION OF THE DRAWING

The included FIGURE is a block diagram of an inventive tap changing transformer control circuit utilizing a true RMS to D.C. converter.

DETAILED DESCRIPTION OF THE INVENTION

As stated hereinabove, various types of AC voltage level detectors may be used in controling the output from the potential transformers in power transmission systems. Presently, true RMS voltage detection is not used since the circuitry is relatively complex, and accordingly, other types of voltage level detectors are in common use. (RMS=root-mean-square)

Mathematically, it can be shown that if the wave form is a pure sine wave the various voltage level detection methods will give identical results if the proper weighting factors are used. Thus, for a pure sine wave all the methods will be equally accurate, assuming uniform accuracy of the various circuits. However, it has been found that when harmonic distortion is present in the wave form, the results are quite different for the various methods.

Accordingly, the present invention provides a load tap changing transformer control circuit including a true RMS converter (detector) providing an output which eliminates errors due to waveshape distortion and therefore provides a more accurate and reliable control to the associated transformer.

The drawing shows the inventive tap changing transformer control circuit 11 of the invention. The potential to be measured is coupled through switch 12 and lead 14 to a power transformer 19.

The power supply circuit 15 for providing the various defined voltages for energizing circuit 11 receives the A.C. potential through switch 12 and lead 13. Power for driving the tap changing motor 20 is coupled through lead 16, switch 17 and lead 18 to controllably energize the motor control circuitry generally labeled 43 and motor 20 to actuate the associated transformer selector switches in response to circuit 11, as will be explained.

Transformer 19 couples a voltage proportional to the potential to be measured through resistor 21 to a summing amplifier circuit 22. Summing amplifier circuit 22 comprises an operational amplifier 23, of conventional design and operation. The input from transformer 19 is coupled to the inverting (−) input terminal of amplifier 23, a second input to the inverting terminal of amplifier 23 is provided from a line drop compensator 26, to be explained. The non-inverting (+) terminal of amplifier 23 is coupled to ground reference.

A current transformer 25 receives an input representative of the load current and couples to the line drop compensator 26. Compensator 26, includes various adjustable resistor-capacitor (RC) networks to develop a voltage proportional to the transmission line voltage drop, which is adjusted by RC networks, to be precisely in phase with the voltage drop along the transmission line. The output from the line drop compensator 26 and the output from transformer 19 are coupled to summing amplifier circuit 22 which provides a composite output simulating the voltage being provided to the user.

Line compensator 26 uniquely provides +R (resistance) +X (reactance), −R and −X features, as follows. Transformer 25 couples a voltage through an RC filter network 49 across an input resistor 52. Diodes generally labeled as 50 are connected at the input side of resistor 52 to limit the voltage. The output of resistor 52 is coupled to a two position switch 51 having a pair of stationary contacts, labeled +R and −R in the drawing, which connect to an operational amplifier 63.

Contact +R couples voltage through a series resistor 59 to the inverting (−) terminal of operational amplifier 63, and the contact −R couples a voltage across a parallel connected resistor 60 to the non-inverting (+) terminal of amplifier 63. The output from amplifier 63 is coupled through a variable resistor 67, a series resistor-capacitor network 68, and lead 69 to the inverting (−) terminal of summing amplifier 23.

The output across resistor 52 is also coupled through lead 53, resistor 54, and resistor 55 to the inverting (−) terminal of operational amplifier 57. The junction of resistors 54 and 55 is coupled through capacitor 56 to ground reference. An RC feedback circuit 58 is coupled across amplifier 57. The output of amplifier 57 is coupled through a two position switch 61 similar to switch 51 and having a pair of stationary contacts, labeled +X and −X in the drawing. The +X contact of switch 59 is coupled through a resistor 62 to the inverting (−) terminal of operational amplifier 65; and the −X contact of switch 59 is connected across resistor 64 to the non-inverting terminal of amplifier 65. The output from amplifier 65 is coupled from across variable resistor 70 and through a series resistor-capacitor network 66 and lead 69 to the inverting (−) terminal of summing amplifier 23.

Thus, dependent on the position of the switch 51, a +R or −R factor is coupled through amplifier 63 to the summing amplifier circuit 22. Likewise dependent on the position of switch 61, a +X or −X factor is coupled through amplifier 63 to the summing amplifier circuit 22.

The output of summing amplifier circuit 22 is coupled to a true RMS to D.C. converter 28 such as an AD 536 AKH integrated logic (IC) chip manufactured by Analog Devices Company. Converter 28 provides a voltage output which is a true representation of the potential to be measured.

A band center adjustment circuit 29 comprising an operational amplifier 30 and an adjustable resistor network generally labeled 31, provides an adjustable output which determines the center adjustment of the band which the circuit must maintain. This provides converter 28 with a voltage reference point to which the converter 28 is referenced.

The output from the converter 28 is coupled through lead 41 to a bandwidth circuitry 42 which determines the bandwidth, or voltage variation, which may be tolerated by the system. In more detail, the output from the RMS converter 28 is coupled through lead 41 to the non-inverting (+) terminal of a first operational amplifier 34 and to the inverting (−) terminal of a second operational amplifier 35. Bandwidth circuitry 42 includes a series connected resistor network 33 operating as a voltage divider. An output from intermediate voltage point 36 of the resistor network 33 is coupled to the inverting terminal of operational amplifier 34, and a second output from a relatively lower voltage point 37 of the resistor network 33 is coupled to the non-inverting terminal of operational amplifier 35.

The output from the converter 28 is thus referenced to a maximum and minimum voltage as set on voltage divider resistor network 33. If the voltage from converter 28 is below the voltage set at point 37 of network 33, operational amplifier 35 will couple a signal to And gate 39 and a timer 77 to energize the relay driver circuitry 40 to, in turn, energize the raise and lower motor relay 43 to drive the motor 20 to actuate the tap selector switch. Conversely, if the voltage from converter 28 is above the voltage set at point 36 of network 33, operational amplifier 34 will couple a signal to And gate 38 and timer 77 to energize the relay driver circuitry 40 to lower the tap selector switch.

LED's (light emitting diodes) 47 and 48 connected to the outputs of operational amplifiers 35 and 34 respectively, light-up when that amplifier conducts and the tap selector switch is being actuated.

As mentioned above, the manually adjustable 0–120 second timer 77 receives an initiating input from each of amplifiers 34 and 35 through respective diodes 80 and 81 when that amplifier conducts. Timer 77 provides a time delay after which gate 38 or 39 will activate the relay driver circuitry 40.

And gates 38 and 39 each comprise a three input And gate. As mentioned, the first input to each of And gates 38 and 39 is from amplifiers 34 and 35 through leads 71 and 72 respectively. The second input to each of gates 38 and 39 is from the timer 77 through lead 73 which delays the operation of the gates 38 and 39 for the selected maximum 120 second period of time initiated by an output from either of operational amplifiers 34 and 35. A third input to gates 38 and 39 is obtained through lead 74 from power on time delay circuit 46.

As will be appreciated, a feedback condition is effected such that when the motor 20 moves the tap selector switch, such that the output from converter 28 is changed to within the preset voltage level range, operational amplifiers 34 and 35 will cease conducting and turn off gates 38 and 39 respectively to cause the motor to stop.

The motor power lead 18 is also connected to an operations counter 75 to light an indicator light when the tap changer is being moved by the motor 20. The circuit 11 further includes a low voltage shut-down circuit 45 which causes the circuit to turn off the relay drive circuit 40 when the input voltage is below a minimum level. The power-on time delay circuit 46 provides a time delay to enable the Power to be On for a selected amount of time before the relay driver circuitry 40 may be actuated.

While the invention has been particularly shown and described with reference to a preferred embodiment thereof, it will be understood by those skilled in the art, that various changes in form and details may be made therein without departing from the spirit and scope of the invention.

I claim:

1. In an A.C. power distribution system utilizing tap changing transformers having tap selector switches selectively actuatable by a motor, a tap changer control circuit comprising in combination, means for providing a first voltage representative of the potential to be measured, means for providing a second voltage representative of the system transmission line voltage drop, means for adjusting said first and second voltage, processing said first and second voltages for providing a composite voltage, an RMS to D.C. converter for receiving said composite voltage for providing a true RMS to D.C. output, means for determining a reference voltage range, means for providing a motor drive signal when the converter output is outside said range, and motor circuitry being responsive to said signal to energize said motor to actuate said tap selector switches to change the transformer setting.

2. Apparatus as in claim 1 including a line drop compensator having resistor-capacitor networks and switching means for providing +R, −R, +X and −X factors, wherein R represents resistance and X represents reactance.

3. Apparatus as in claim 1 wherein said means for determining a reference voltage comprises a bandwidth determining circuit including a voltage divider for providing maximum and minimum reference voltages, operational amplifiers for comparing said maximum and minimum voltages with the composite output from said RMS converter, and gating means selectively responding to said compared voltages to provide the motor drive signal to energize the motor in first and second relative directions.

4. Apparatus as in claim 3 including timer means for electrically delaying said gating means for a preset period of time.

5. Apparatus as in claim 3 including a voltage center adjustment for providing an adjustable voltage level reference to said converter.

6. Apparatus as in claim 3 wherein said bandwidth circuitry provides an output when the converter composite output is above and below said bandwidth, relay driver circuitry energizable by said bandwidth circuit, and motor delay circuitry controlled by said relay driver circuitry for energizing said motor.

7. Apparatus as in claim 1 including a summing amplifier for processing said first and second voltages.

* * * * *